United States Patent
Morales et al.

(10) Patent No.: US 11,554,858 B2
(45) Date of Patent: Jan. 17, 2023

(54) ROTOR MAST WITH COMPOSITE INSERT

(71) Applicant: Bell Helicopter Textron Inc., Fort Worth, TX (US)

(72) Inventors: Gilberto Morales, Arlington, TX (US); Roozbeh Kiamanesh, Irving, TX (US); Russell Mueller, Coppell, TX (US)

(73) Assignee: Textron Innovations inc., Providence, RI (US)

( * ) Notice: Subject to any disclaimer, the term of this patent is extended or adjusted under 35 U.S.C. 154(b) by 227 days.

(21) Appl. No.: 16/435,550

(22) Filed: Jun. 9, 2019

(65) Prior Publication Data

US 2020/0385108 A1    Dec. 10, 2020

(51) Int. Cl.
  *B64C 27/12*  (2006.01)
  *B64C 27/32*  (2006.01)
  *B64C 27/00*  (2006.01)
(52) U.S. Cl.
  CPC ............ *B64C 27/12* (2013.01); *B64C 27/006* (2013.01); *B64C 27/327* (2013.01)

(58) Field of Classification Search
  CPC ..... B64C 27/12; B64C 27/006; B64C 27/327; B64C 27/48; B64C 11/02; F16B 9/05; F16B 9/054; F16C 3/023; F16C 3/026
  See application file for complete search history.

(56) References Cited

U.S. PATENT DOCUMENTS

| 7,938,628 | B2 | 5/2011 | Lin | |
| 2010/0166568 | A1* | 7/2010 | Lin | B64C 27/58 |
| | | | | 416/244 R |
| 2017/0267339 | A1* | 9/2017 | Bergeson | B64C 27/48 |
| 2020/0103351 | A1* | 4/2020 | Gurvich | F16C 3/026 |
| 2020/0319042 | A1* | 10/2020 | Hale | G01L 3/104 |

* cited by examiner

*Primary Examiner* — Richard R. Green
*Assistant Examiner* — Ashesh Dangol
(74) *Attorney, Agent, or Firm* — Lightfoot & Alford PLLC

(57) ABSTRACT

A rotor mast including an outer member defining a channel therethrough and an inner member disposed in the channel through the outer member, wherein the inner member is configured to apply a compressive force to the outer member.

20 Claims, 11 Drawing Sheets

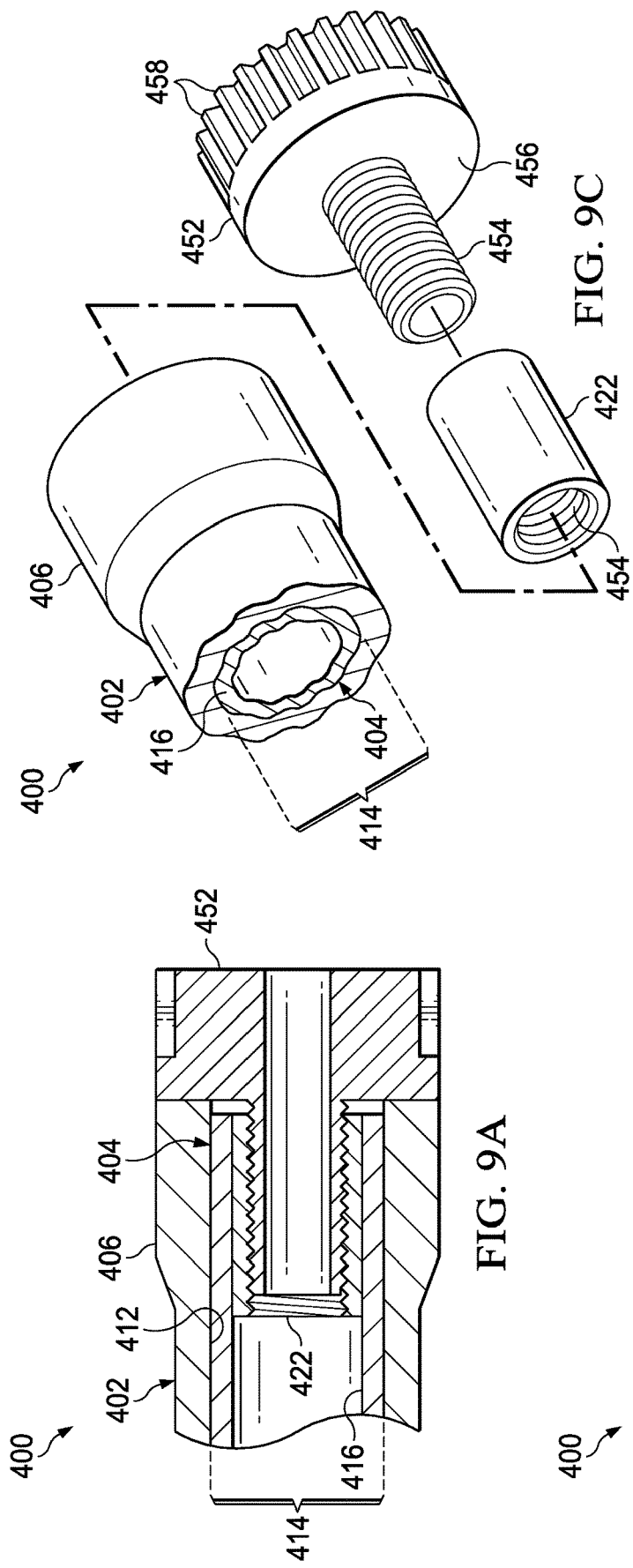

ROTOR MAST WITH COMPOSITE INSERT

BACKGROUND

In order for rotorcraft masts to handle the large and varied loads they are subjected to, they are generally fabricated from steel. However, steel often includes latent flaws in the material. As such, rotor masts fabricated from steel may include latent flaws within the steel that may result in crack propagation under tensile loads. In order to prevent this, the exterior surface of traditional steel rotor masts are shot peened to plastically deform the outside surface causing a residual compressive stress thereon. While this aids in preventing crack propagation on the exterior surface, where crack propagation is most likely to occur, it does not prevent crack propagation on the interior surface of the rotor mast or within the material itself. Because rotor masts do not have redundant structure, and failure of a rotor mast would be catastrophic, traditional steel rotor masts are designed with a very large safety factor to avoid failure caused by a latent flaw in the material. Therefore, traditional rotor masts are much heavier than they would need to be if the risk of crack propagation could be further reduced.

BRIEF DESCRIPTION OF THE DRAWINGS

FIG. 8B is an exploded cross-sectional view of the second end of the rotor mast of

FIG. 9A.

FIG. 9A is a cross-sectional side view of a first end of another rotor mast, according to this disclosure.

FIG. 9B is an exploded cross-sectional view of the first end of the rotor mast of FIG. 7A.

FIG. 9C is an exploded oblique view of the first end of the rotor mast of FIG. 7A.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a rotor mast having a metal outer member and a composite inner member that is configured to apply a compressive force to the metal outer member and a method of assembling the same. The compressive force applied to the outer member serves to help prevent crack propagation in the metal. With this additional safeguard against crack propagation, the metal outer member may be fabricated with a thinner sidewall than would otherwise be required. The rotor mast may also be configured so that the composite inner member carries some of the loads transmitted through the rotor mast. Moreover, given the extremely high tensile strength of composite materials, it is possible to configure the rotor mast such that the inner member acts as a redundant failsafe structure in the event the outer member fails. This provides a helicopter with the ability to still perform an emergency autorotation landing even in the event of a mast failure. Accordingly, the rotor mast disclosed herein provides weight savings and improved safety over traditional steel rotor masts.

Figure 1:
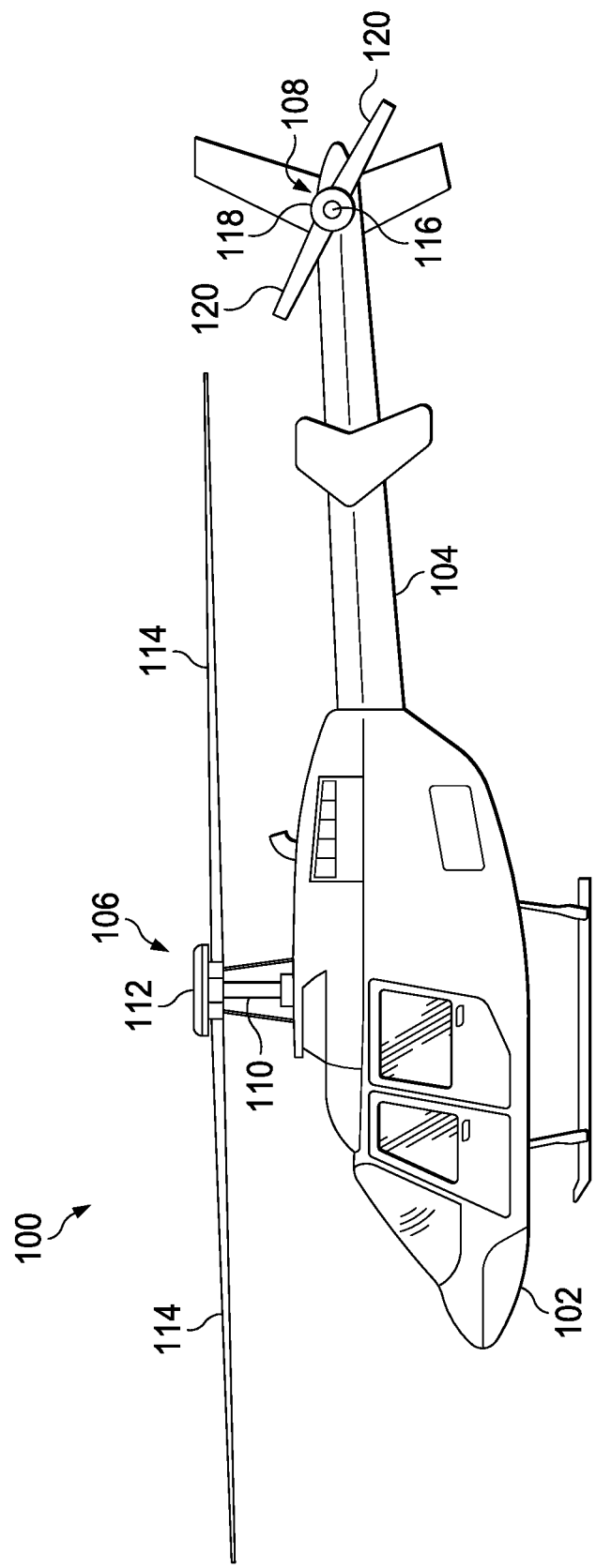
FIG. 1 is a side view of an aircraft including a rotor mast with a composite insert, according to this disclosure.
Figure 2:
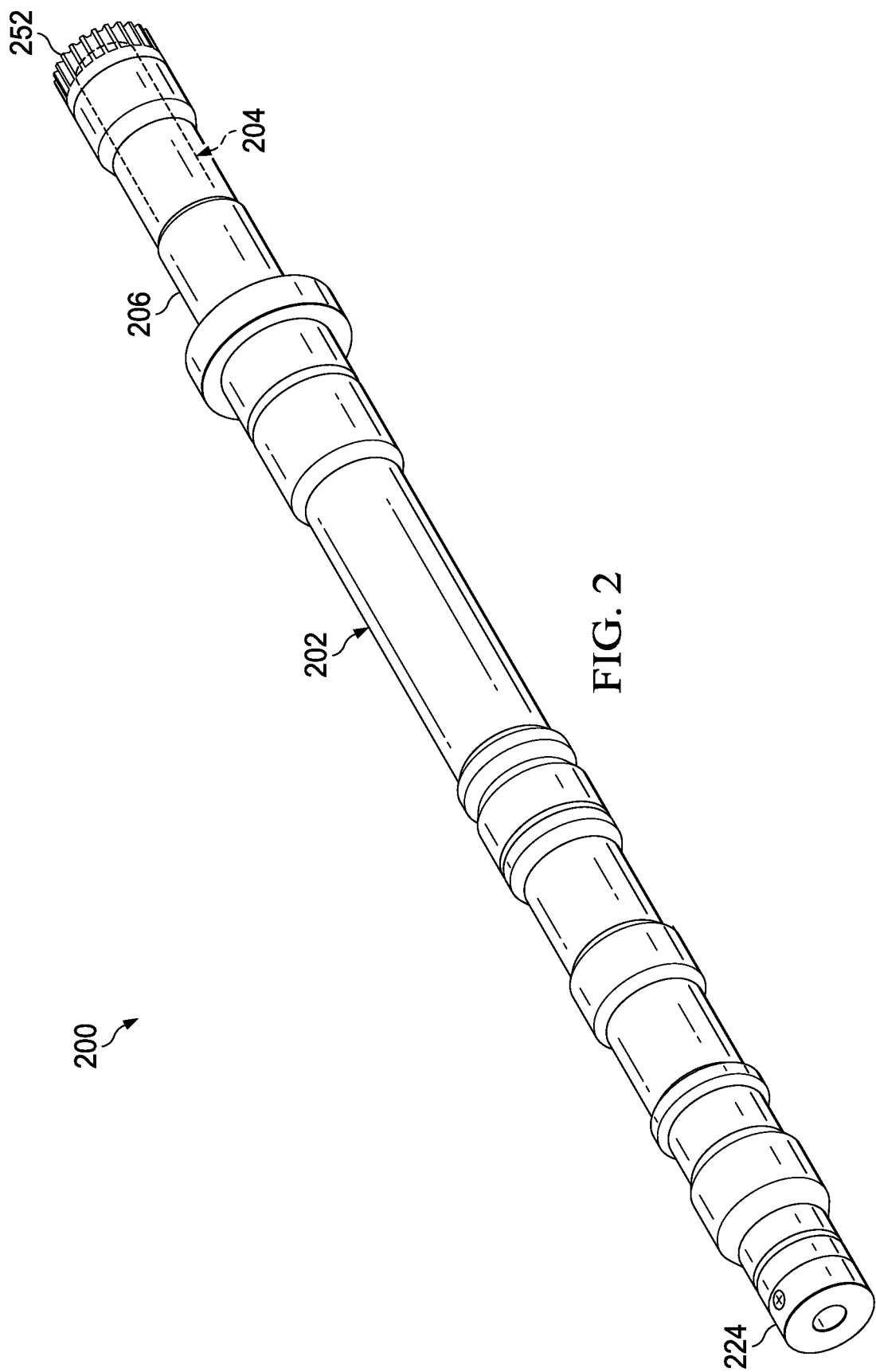
FIG. 2 is an oblique view of a rotor mast, according to this disclosure.
Figure 3:
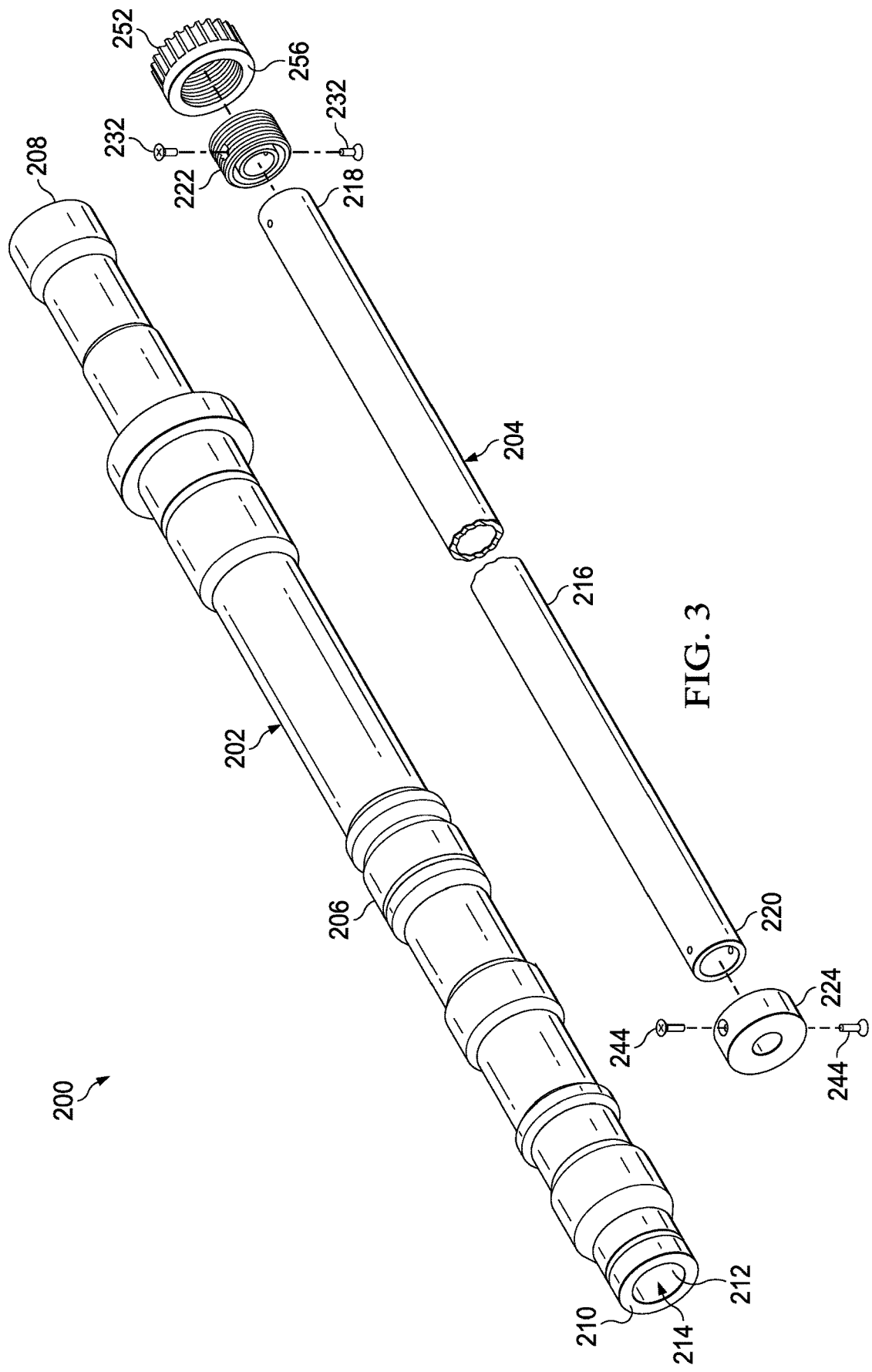
FIG. 3 is an oblique exploded view of the rotor mast of FIG. 2.
Figure 4:
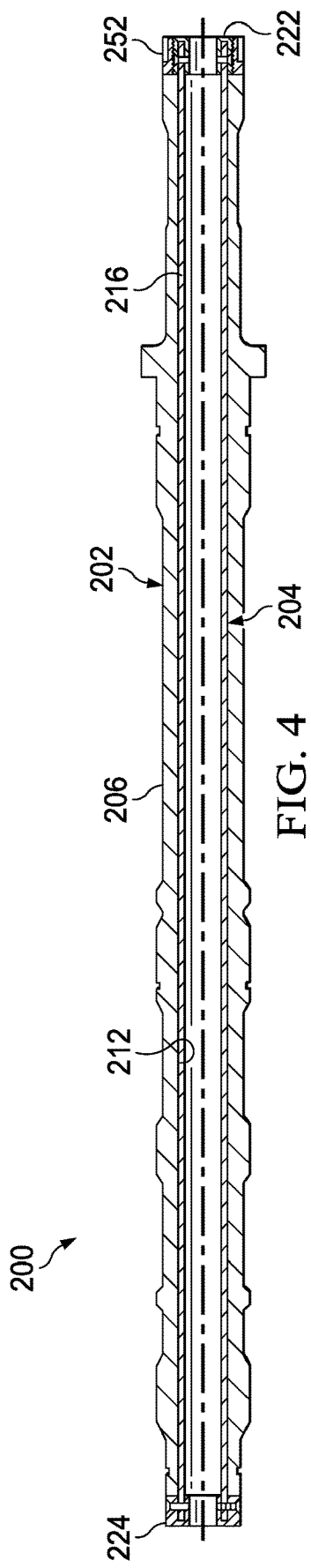
FIG. 4 is a cross-sectional side view of the rotor mast of FIG. 2.

FIG. 1 shows an aircraft 100 that includes a fuselage 102, a tail section 104, a main rotor assembly 106, and a tail rotor assembly 108. Main rotor assembly 106 includes a rotor mast 110, a rotor hub 112 coupled to rotor mast 110, and a plurality of rotor blades 114 extending from rotor hub 112. Tail rotor assembly includes a tail rotor mast 116, a tail rotor hub 118 coupled to tail rotor mast 116, and a plurality of tail rotor blades 120 extending from tail rotor hub 118. Main rotor assembly 106 provides cyclic and collective pitching of rotor blades 114 to enable varying vertical lift and horizontal thrust of aircraft 100 while tail rotor assembly 108 provides collective pitching of tail rotor blades 120 to enable varying anti-torque thrust. Rotational energy is produced by a powerplant housed within fuselage 102. The rotational energy produced by the powerplant is transferred through a main gear box that is coupled between the powerplant and rotor mast 110. Rotor mast 110 is configured to receive the rotational energy from the main gearbox and transmit it to rotor hub 112. In addition to transmitting rotational energy, rotor mast 110 carries the entire weight of aircraft 100 in tension while hovering and even larger tensile loads under acceleration, as well as carrying the shear and bending loads between rotor hub 112 and fuselage 102. The rotational energy produced by the powerplant is also transferred through a tail rotor gearbox that is coupled between the powerplant and tail rotor mast 116. Tail rotor mast 116 is configured to receive the rotational energy from the tail rotor gearbox and transmit it to tail rotor hub 118. In addition to transmitting rotational energy, tail rotor mast 116 carries the shear and bending loads between tail rotor hub 118 and tail section 104. In order to carry these loads, rotor mast 110 and/or tail rotor mast 116 may be comprised as described below. It should be understood that aircraft 100 is only one exemplary use for the rotor masts disclosed herein. The rotor masts described herein may be utilized in any application to transmit rotational energy.

Referring now to FIGS. 2-6C, a rotor mast 200 is illustrated. Rotor mast 200 includes an outer member 202 and an inner member 204 configured to apply a compressive force to outer member 202. Outer member includes an external surface 206, a first bearing area 208, a second bearing area 210, and an internal surface 212 defining a channel 214 that extends between first bearing area 208 and second bearing area 210. As shown, external surface 206 may have a variable outer diameter along a length thereof, and may include structural features configured to cooperate with other components such as a gearbox, a rotor hub, mast bearings, etc.

Figure 5A:
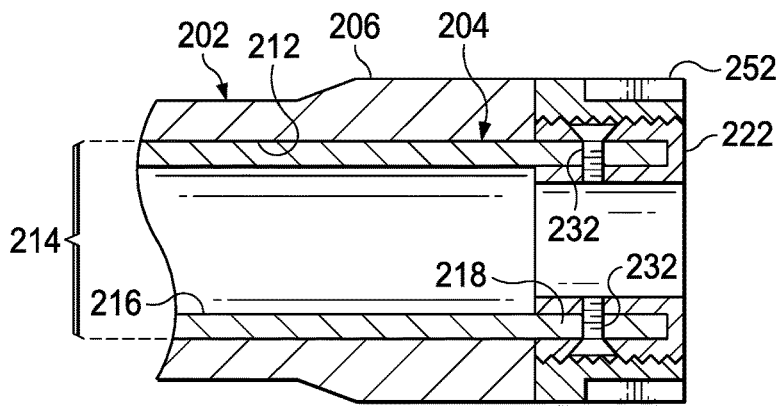
FIG. 5A is a cross-sectional side view of a first end of the rotor mast of FIG. 2.
Figure 5B:
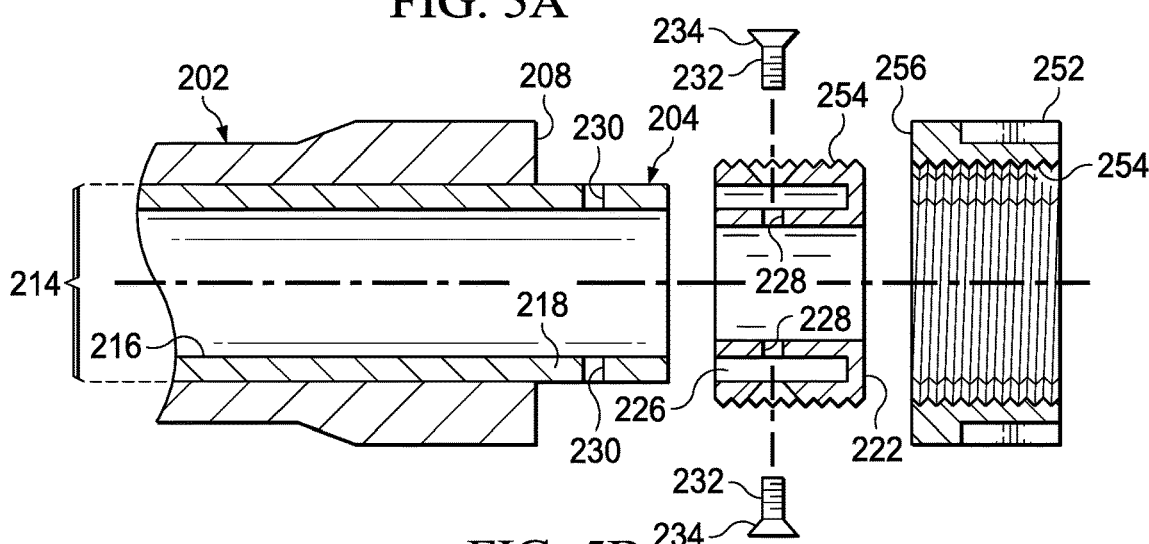
FIG. 5B is an exploded cross-sectional view of the first end of the rotor mast of FIG. 2.
Figure 5C:
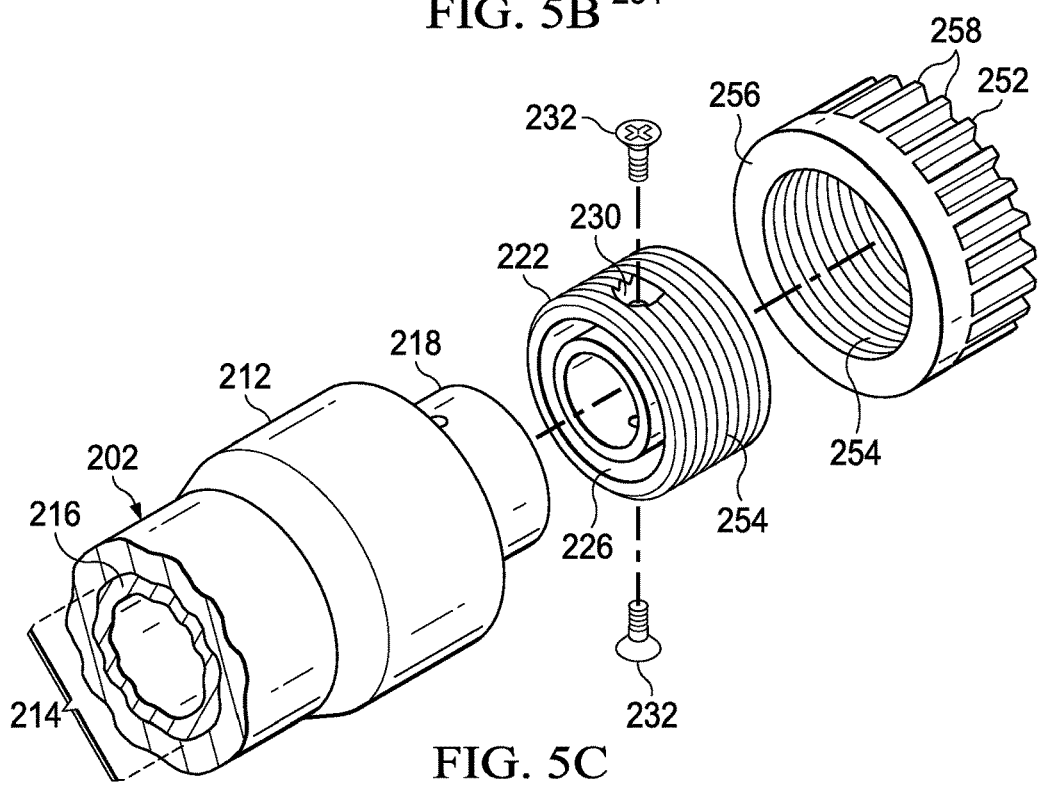
FIG. 5C is an exploded oblique view of the first end of the rotor mast of FIG. 2.

Inner member 204 includes a shaft 216 configured to fit within channel 214 of outer member 202. Shaft 216 comprises a hollow tube and includes a first end 218 and an opposite second end 220 that extend from channel 214 beyond first bearing area 208 and second bearing area 210, respectively. Inner member 204 includes a first cuff 222 coupled to first end 218 of shaft 216 and a second cuff 224 coupled to second end 220 of shaft 216. As best shown in FIGS. 5A-5C, first cuff 222 includes an annular slot 226 configured to receive first end 218 of shaft 216 therein. Annular slot 226 may have a roughened surface configured to increase friction between first cuff 222 and first end 218, or to provide a better surface for adhesive bonding. First cuff 222 further includes a pair of threaded apertures 228 extending therethrough. Apertures 228 are configured to align with a pair of openings 230 extending through first end 218 of shaft 216. Apertures 228 and openings 230 are configured to receive fasteners 232 therethrough which couple first cuff 222 to first end 218 of shaft 216. Fasteners 232 are shown as screws, but they may comprise bolts, rivets, pins, or any other type of mechanical fasteners suitable for securing first cuff 222 to first end 218 of shaft 216. In addition to fasteners 232, first cuff 222 may be bonded to first end 218 of shaft 216 using a reactive or non-reactive adhesive, or any other suitable type of adherent substance. Apertures 228 are countersunk to receive heads 234 of fasteners 232 therein.

Figure 6A:
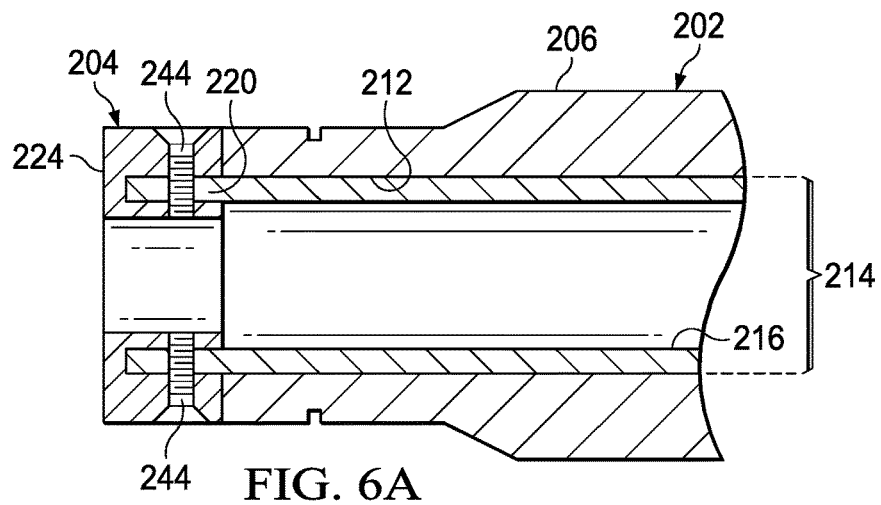
FIG. 6A is a cross-sectional side view of a second end of the rotor mast of FIG. 2.
Figure 6B:
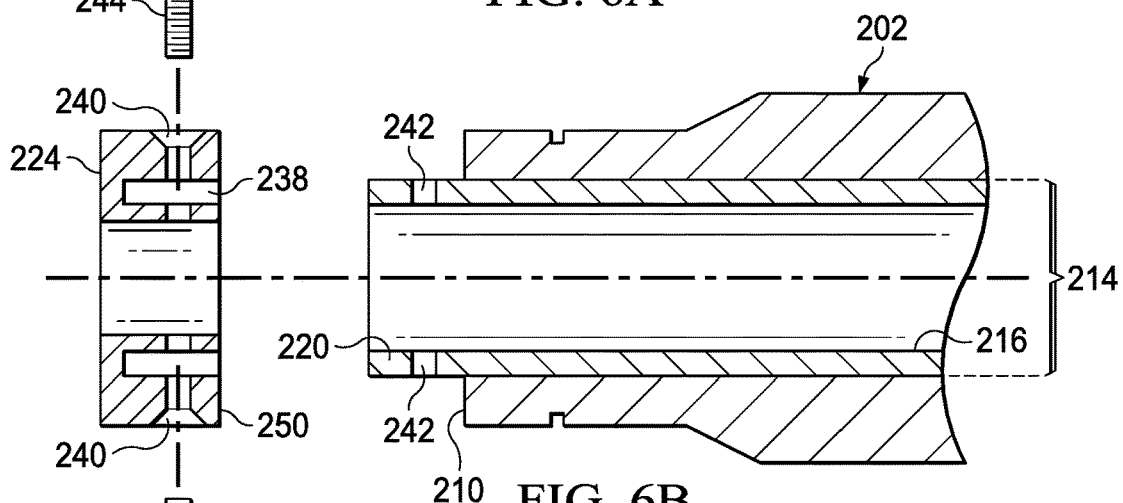
FIG. 6B is an exploded cross-sectional view of the second end of the rotor mast of FIG. 2.
Figure 6C:
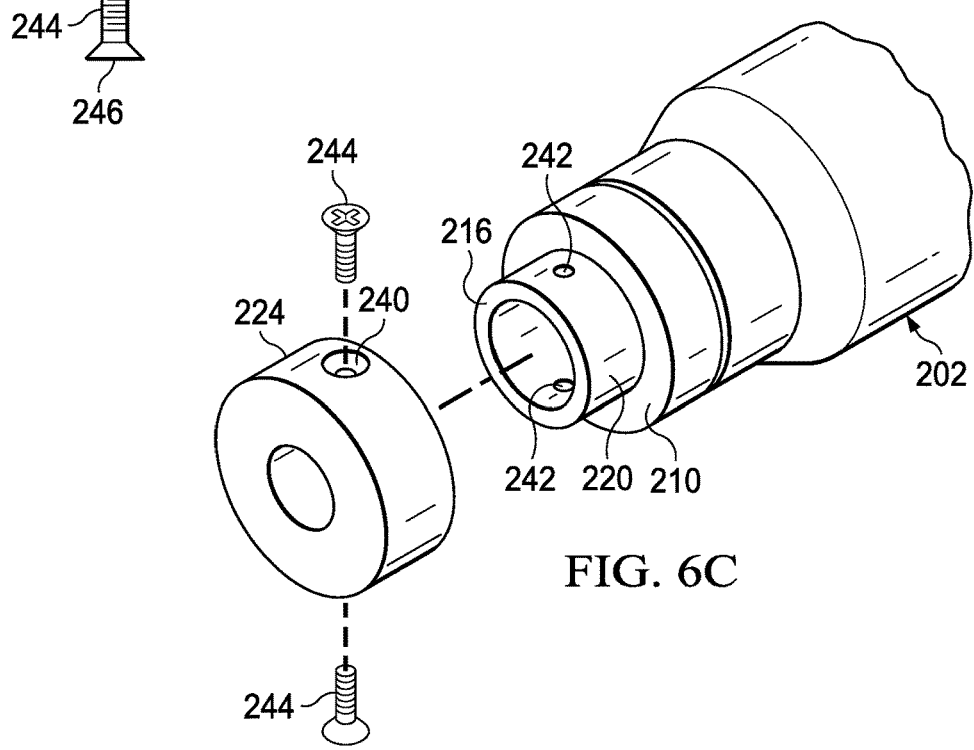
FIG. 6C is an exploded oblique view of the second end of the rotor mast of FIG. 2.

As best shown in FIGS. 6A-6C, second cuff 224 includes an annular slot 238 configured to receive second end 220 of shaft 216 therein. Annular slot 238 may have a roughened surface configured to increase friction between second cuff 224 and second end 220, or to provide a better surface for adhesive bonding. Second cuff 224 further includes a pair of threaded apertures 240 extending therethrough. Apertures 240 are configured to align with a pair of openings 242 extending through second end 220 of shaft 216. Apertures 240 and openings 242 are configured to receive fasteners 244 therethrough which couple second cuff 224 to second end 220 of shaft 216. Fasteners 244 are shown as screws, however, they may comprise bolts, rivets, pins, or any other type of mechanical fasteners suitable for securing second cuff 224 to second end 220 of shaft 216. In addition to fasteners 244, second cuff 224 may be bonded to second end 220 of shaft 216 using a reactive or non-reactive adhesive, or any other suitable type of adherent substance. Apertures 240 are countersunk to receive heads 246 of fasteners 244 therein. Second cuff 224 includes a second bearing surface 250 configured to contact and bear against second bearing area 210 of outer member 202.

Referring again to FIGS. 5A-5C, a clamping element 252 is coupled to first cuff 222 via complimentary threads 254 located on the inside of clamping element 252 and the outside of first cuff 222. Clamping element 252 includes a first bearing surface 256 oriented towards first bearing area 208 of outer member 202. Rotation of clamping element 252 relative to first cuff 222 advances clamping element 252 towards outer member 202 and causes contact between first bearing surface 256 of clamping element 252 and first bearing area 208 of outer member 202. Further rotation of clamping element 252 creates a compressive force in outer member 202 between first bearing area 208 and second bearing area 210 while creating a tensile force through inner member 204. Clamping element 252 includes splines 258 configured to cooperatively engage a tool to facilitate rotation thereof. Rather than splines 258, clamping element 252 may include any other structure to facilitate engagement therewith. For example, the outer surface of clamping element 252 may be hexagonal or square. While rotor mast 200 is shown with inner member 204 with second cuff 224 coupled to second end 220 of shaft 216, it should be understood that second cuff 224 could be replaced with another first cuff 224 and clamping element 252 coupled to second end 220 of shaft 216, such that the compressive force is generating by advancing the two clamping elements 252 towards each other.

Referring now to FIGS. 7A-8C, a rotor mast 300 is illustrated. Rotor mast 300 includes an outer member 302 and an inner member 304 configured to apply a compressive force to outer member 302. Outer member includes an external surface 306, a first bearing area 308, a second bearing area 310, and an internal surface 312 defining a channel 314 that extends between first bearing area 308 and second bearing area 310. As shown, external surface 306 may have a variable outer diameter along a length thereof, and may include structural features configured to cooperate with other components such as a gearbox, a rotor hub, mast bearings, etc.

Figure 7A:
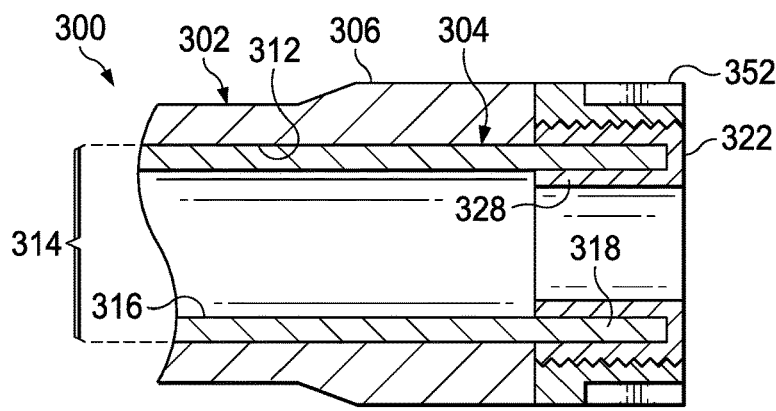
FIG. 7A is a cross-sectional side view of a first end of another rotor mast, according to this disclosure.
Figure 7B:
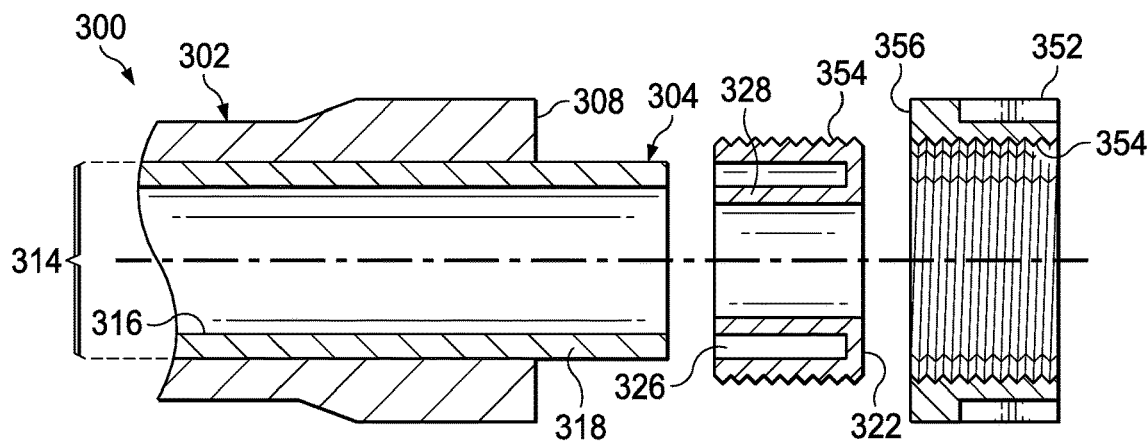
FIG. 7B is an exploded cross-sectional view of the first end of the rotor mast of FIG. 6A.
Figure 7C:
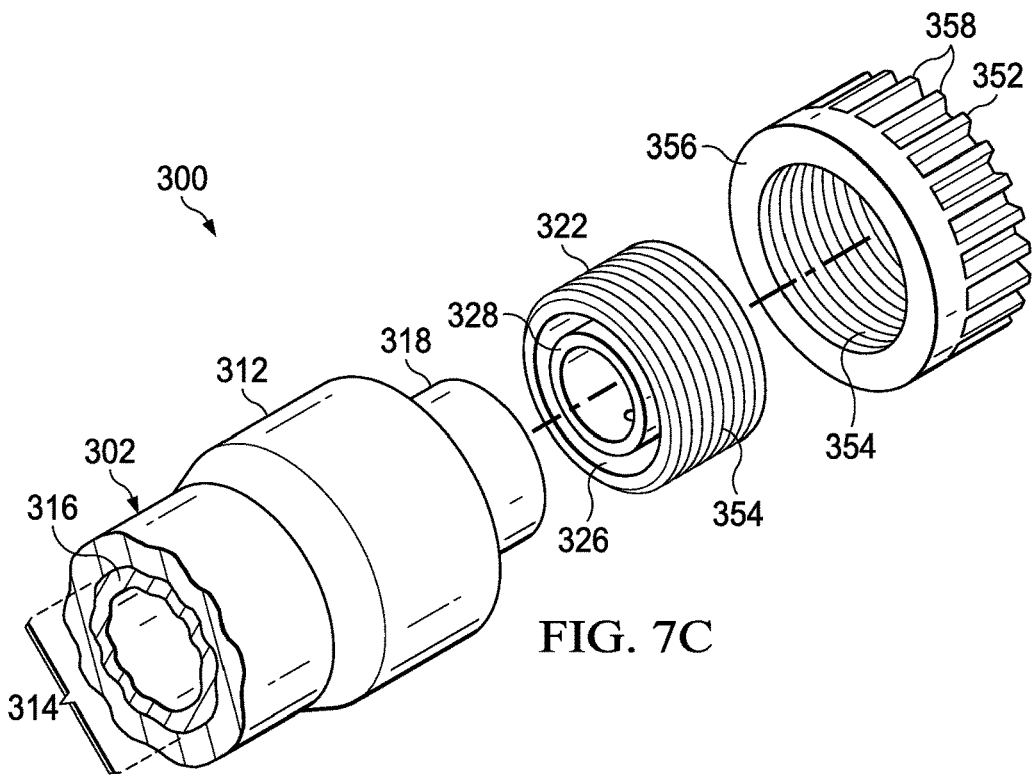
FIG. 7C is an exploded oblique view of the first end of the rotor mast of FIG. 6A.

Inner member 304 includes a shaft 316 configured to fit within channel 314 of outer member 302. Shaft 316 comprises a hollow tube and includes a first end 318 and an opposite second end 320 that extend from channel 314 beyond first bearing area 308 and second bearing area 310, respectively. Inner member 304 includes a first cuff 322 coupled to first end 318 of shaft 316 and a second cuff 324 coupled to second end 320 of shaft 316. As best shown in FIGS. 7A-7C, first cuff 322 includes an annular slot 326 configured to receive first end 318 of shaft 316 therein. Annular slot 326 may have a roughened surface configured to increase friction between first cuff 322 and first end 318, or to provide a better surface for adhesive bonding. First cuff 322 is bonded to first end 318 of shaft 316 using a reactive or non-reactive adhesive, or any other suitable type of adherent substance. Because first cuff 322 does not include a mechanical fastener, it may be advantageous to make first end 318 of shaft 316, as well as annular slot 326 and first cuff 322, longer to provide a larger surface area for bonding. In addition, or alternatively, it may be advantageous to extend an interior portion 328 further into the hollow center of shaft 316 to provide a larger surface area for bonding.

Figure 8A:
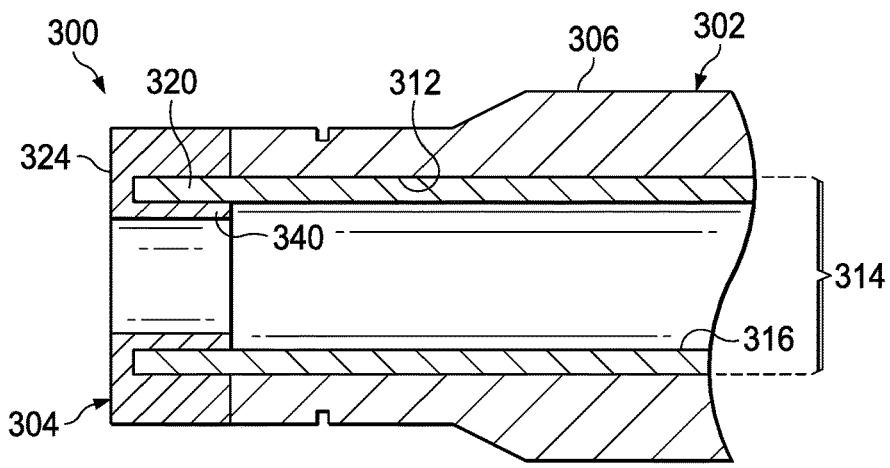
FIG. 8A is a cross-sectional side view of a second end of another rotor mast, according to this disclosure.
Figure 8B:
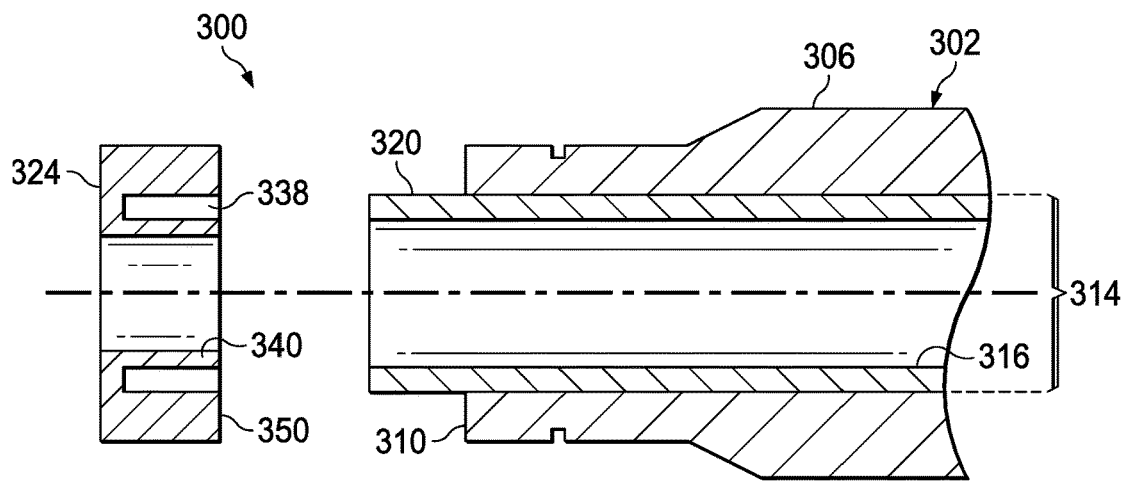
Figure 8C:
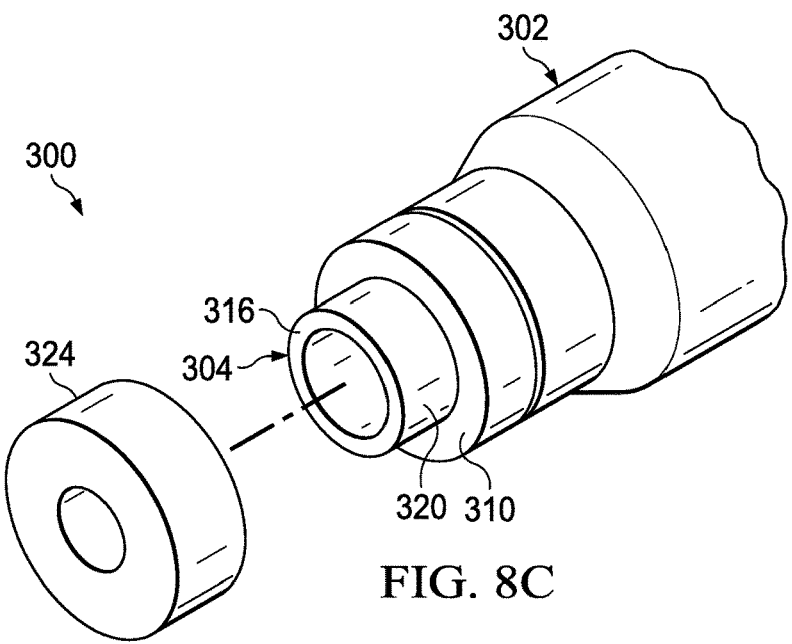
FIG. 8C is an exploded oblique view of the second end of the rotor mast of FIG. 9A.

As best shown in FIGS. 8A-8C, second cuff 324 includes an annular slot 338 configured to receive second end 320 of shaft 316 therein. Annular slot 338 may have a roughened surface configured to increase friction between second cuff 324 and second end 320, or to provide a better surface for adhesive bonding. Second cuff 324 is bonded to second end 320 of shaft 316 using a reactive or non-reactive adhesive, or any other suitable type of adherent substance. Second cuff 324 includes a second bearing surface 350 configured to contact and bear against second bearing area 310 of outer member 302. Similar to first end 318 and first cuff 322, it may be advantageous to make second end 320 of shaft 316, as well as annular slot 338 and second cuff 324, longer to provide a larger surface area for bonding. In addition, or alternatively, it may be advantageous to extend an interior portion 340 further into the hollow center of shaft 316 to provide a larger surface area for bonding.

Referring again to FIGS. 7A-7C, a clamping element 352 is coupled to first cuff 322 via complimentary threads 354 located on the inside of clamping element 352 and the outside of first cuff 322. Clamping element 352 includes a first bearing surface 356 oriented towards first bearing area 308 of outer member 302. Rotation of clamping element 352 relative to first cuff 322 advances clamping element 352 towards outer member 302 and causes contact between first bearing surface 356 of clamping element 352 and first bearing area 308 of outer member 302. Further rotation of clamping element 352 creates a compressive force in outer member 302 between first bearing area 308 and second bearing area 310 while creating a tensile force through inner member 304. Clamping element 352 includes splines 358 configured to cooperatively engage a tool to facilitate rotation thereof. Rather than splines 358, clamping element 352 may include any other structure to facilitate engagement therewith. For example, the outer surface of clamping element 352 may be hexagonal or square. While rotor mast 300 is shown with inner member 304 having second cuff 324 coupled to second end 320 of shaft 316, it should be understood that second cuff 324 could be replaced with another first cuff 324 and clamping element 352 coupled to second end 320 of shaft 316, such that the compressive force is generating by advancing the two clamping elements 352 towards each other.

Referring now to FIGS. 9A-10C, a rotor mast 400 is illustrated. Rotor mast 400 includes an outer member 402 and an inner member 404 configured to apply a compressive force to outer member 402. Outer member includes an external surface 406, a first bearing area 408, a second bearing area 410, and an internal surface 412 defining a channel 414 that extends between first bearing area 408 and second bearing area 410. As shown, external surface 406 may have a variable outer diameter along a length thereof, and may include structural features configured to cooperate with other components such as a gearbox, a rotor hub, mast bearings, etc.

Inner member 404 includes a shaft 416 configured to fit within channel 414 of outer member 402. Shaft 416 comprises a hollow tube and includes a first end 418 that does not extend from channel 414 beyond first bearing area 408 and an opposite second end 420 that does extend from channel 414 beyond second bearing area 410. Inner member 404 includes a first cuff 422 coupled to first end 418 of shaft 416 and a second cuff 424 coupled to second end 420 of shaft 416. As best shown in FIGS. 9A-9C, first cuff 422 is disposed within first end 418 of shaft 416. First cuff 422 is bonded to first end 418 of shaft 416 using a reactive or non-reactive adhesive, or any other suitable type of adherent substance. An exterior surface of first cuff 422 may be roughened to increase friction between first cuff 422 and first end 418, or to provide a better surface for adhesive bonding.

Figure 10A:
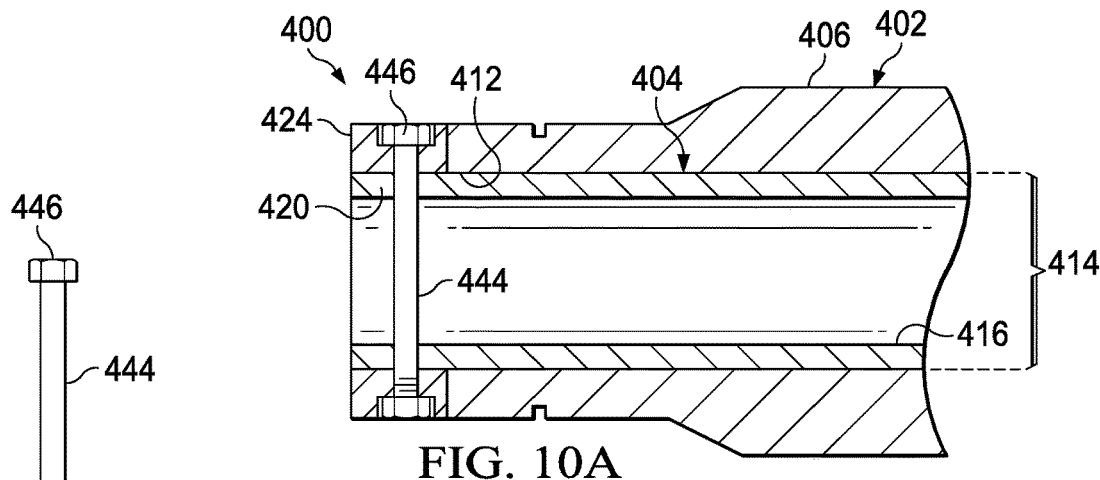
FIG. 10A is a cross-sectional side view of a second end of another rotor mast, according to this disclosure.
Figure 10B:
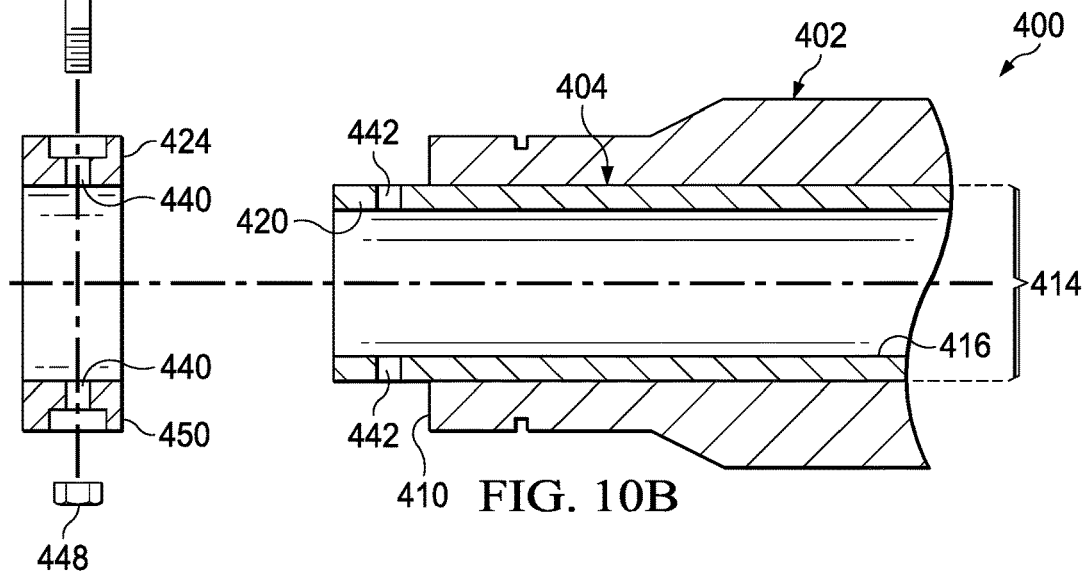
FIG. 10B is an exploded cross-sectional view of the second end of the rotor mast of FIG. 10A.
Figure 10C:
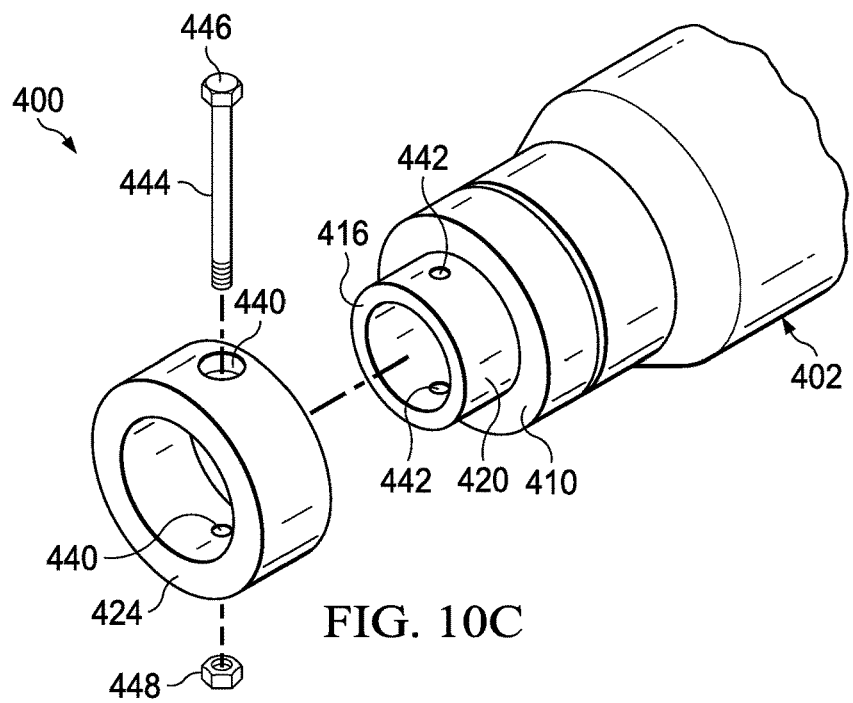
FIG. 10C is an exploded oblique view of the second end of the rotor mast of FIG. 10A.

As best shown in FIGS. 10A-10C, second cuff 424 encircles the exterior of second end 420 of shaft 416. Second cuff 424 includes a pair of apertures 440 extending therethrough configured to align with a pair of openings 442 extending through second end 420 of shaft 416. Apertures 440 and openings 442 are configured to receive a fastener 444 therethrough which couples second cuff 424 to second end 420 of shaft 416. Fastener 444 may comprise a bolt, a rivet, a pin, or any other type of mechanical fastener suitable for securing second cuff 424 to second end 420 of shaft 416. In addition to fastener 444, second cuff 424 may be bonded to second end 420 of shaft 416 using a reactive or non-reactive adhesive, or any other suitable type of adherent substance. Apertures 440 are counterbored to receive a head 446 and a nut 448 of fastener 444 therein. Second cuff 424 includes a second bearing surface 450 configured to contact and bear against second bearing area 410 of outer member 402.

Referring again to FIGS. 9A-9C, a clamping element 452 is coupled to first cuff 422 via complimentary threads 454 located on the outside of clamping element 452 and the inside of first cuff 422. Clamping element 452 includes a first bearing surface 456 oriented towards first bearing area 408 of outer member 402. Rotation of clamping element 452 relative to first cuff 422 advances clamping element 452 towards outer member 402 and causes contact between first bearing surface 456 of clamping element 452 and first bearing area 408 of outer member 402. Further rotation of clamping element 452 creates a compressive force in outer member 402 between first bearing area 408 and second bearing area 410 while creating a tensile force through inner member 404. Clamping element 452 includes splines 458 configured to cooperatively engage a tool to facilitate rotation thereof. Rather than splines 458, clamping element 452 may include any other structure to facilitate engagement therewith. For example, the outer surface of clamping element 452 may be hexagonal or square. Alternatively, rather than providing structure on the exterior surface of clamping element 452 for tool engagement, clamping element 452 may include a centrally located recess configured to receive a tool therein. While rotor mast 400 is shown with inner member 404 having second cuff 424 coupled to second end 420 of shaft 416, it should be understood that second cuff 424 could be replaced with another first cuff 422 and clamping element 452 coupled to second end 420 of shaft 416, such that the compressive force is generating by advancing the two clamping elements 452 towards each other.

Figure 11:
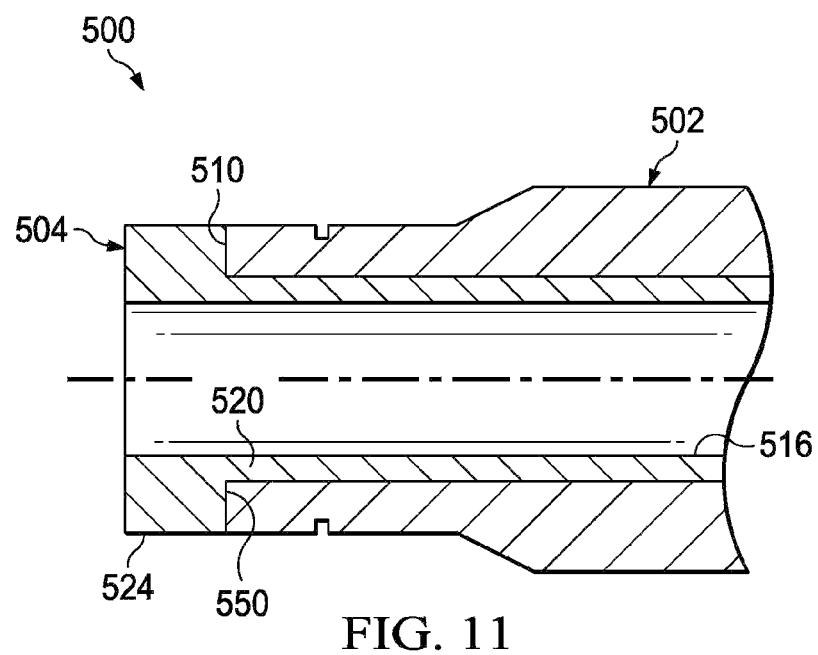
FIG. 11 is a cross-sectional side view of a second end of another rotor mast, according to this disclosure.

Referring now to FIG. 11, a rotor mast 500 having an integral cuff 524 is illustrated. Rotor mast 500 is similar to those described above and includes an outer member 502 and an inner member 504 configured to apply a compressive force to outer member 502. However, rather than attaching a cuff to a second end 520 of a shaft 516 of inner member 504, second end 520 of shaft 516 includes cuff 524 having a second bearing surface 550 configured to bear against a second bearing area 510 of outer member 502 integrally formed therewith. Rotor mast 500 may include any of the cuff and clamping elements described herein to generate the compressive and tensile forces in outer member 502 and inner member 504, respectively.

The components of rotor masts 200, 300, 400, and 500 may comprise any materials suitable for use with a rotor mast. For example, outer members 202, 302, 402, and 502; first cuffs 222, 322, and 422; second cuffs 224, 324, and 424; fasteners 232, 244, and 444; and clamping elements 252, 352, and 452 may comprise a metal, such as steel or titanium, while shafts 216, 316, 416, and 516 may comprise a composite material, such as a fiber-reinforced polymer, which comprises, for example, fibers formed from carbon, aramid, glass, or another material.

The rotor masts disclosed herein may be customized for a particular application. That is, the inner and outer members may be configured to carry more or less of the various loads to which rotor masts endure. This may be accomplished by varying the wall thickness of the members, altering the relative diameters of the members, changing the weave pattern of composite used, etc. In addition to the various means of coupling the cuffs to the shafts described above, the cuffs may also be woven into the shaft prior to curing the composite material. Moreover, any of the features disclosed herein may be interchangeably used with any other features.

A method of assembling rotor mast 200 may be performed as follows: providing outer member 202, inserting shaft 216 into channel 214, coupling first cuff 222 to first end 218 of shaft 216, coupling second cuff 224 to second end 220 of shaft 216, contacting second bearing area 210 of outer member 202 with second bearing surface 250 of second cuff 224, coupling clamping element 252 to first cuff 222, contacting first bearing area 208 of outer member 202 with first bearing surface 256 of clamping element 252, and creating a tensile force in inner member 204 and a compressive force in outer member 202.

Coupling first cuff 222 to first end 218 may include positioning first cuff 222 over first end 218 and drilling openings 230 through first end 218. Alternatively, openings 230 may be created during manufacture of shaft 216 by positioning the fiber material around a mandrel and then removing the mandrel after shaft 216 is cured. Coupling first cuff 222 to first end 218 may include applying an adhesive to first cuff 222 and/or first end 218 and/or inserting fasteners 232 into apertures 228 and openings 230 and securing fasteners 232 therein. Coupling second cuff 224 to second end 220 may include positioning second cuff 224 over second end 220 and drilling openings 242 through second end 220. Alternatively, openings 242 may be created during manufacture of shaft 216 by positioning the fiber material around a mandrel and then removing the mandrel after shaft 216 is cured. Coupling second cuff 224 to second end 220 may include applying an adhesive to second cuff 224 and/or second end 220 and/or inserting fasteners 244 through apertures 240 and openings 242 and securing fasteners 244 therein.

Coupling clamping element 252 to first cuff 222 includes engaging complementary threads 254. Clamping element 252 is then rotated to threadably advance first bearing surface 256 into contact with first bearing area 208. When first bearing surface 256 is in contact with first bearing area 208 and second bearing surface 250 is in contact with second bearing area 210, further advancement of clamping element 252 should preferably be performed by utilizing a tool that measures the torque being applied, such as a torque wrench. This may be facilitated by using a specialized bit configured to engage splines 258 on clamping element 252. While engineering rotor mast 200 for a specific application, a known torque should be determined to impart the desired compressive force on outer member 202.

Prior to assembly, outer member 202 may be shot-peened to create an inherent compressive force on external surface 206. In addition, outer member 202 may be thermally expanded prior to inserting shaft 216 into channel 214. Assembly may also include applying an adhesive to internal surface 212 and/or shaft 216. The method of assembly may be performed in any practicable order.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor mast, comprising:
an outer member including an external surface, an internal surface, a first bearing area perpendicular to an axis of the outer member, and a second bearing area perpendicular to the axis of the outer member, wherein the internal surface defines a channel extending between the first bearing area and the second bearing area and the outer member comprises a metal; and
an inner member disposed within the channel of the outer member, the inner member including a shaft, a clamping element, a cuff coupling the shaft to the clamping element, a first bearing surface perpendicular to an axis of the inner member, and a second bearing surface perpendicular to the axis of the inner member, wherein the first bearing surface is located on the clamping element and the inner member comprises a composite material;
wherein the inner member and outer member are not bonded to each other;
wherein the first bearing area is in contact with the first bearing surface and the second bearing area is in contact with the second bearing surface for reacting opposing axial forces when the outer member is under compression along a length thereof between the first bearing area and the second bearing area and the inner member is under tension along a length thereof between the first bearing surface and the second bearing surface.

2. The rotor mast of claim 1, wherein the shaft comprises the composite material and the cuff and the clamping element comprise a metal.

3. The rotor mast of claim 1, wherein the cuff and the clamping element are coupled via complementary threads such that rotation of the clamping element would advance the first bearing surface towards the second bearing surface.

4. The rotor mast of claim 1, wherein the cuff is bonded and/or mechanically fastened to the shaft.

5. The rotor mast of claim 1, wherein the inner member further comprises a second cuff coupled to the shaft, wherein the second bearing surface is on the second cuff.

6. The rotor mast of claim 1, wherein the second bearing surface is integrally formed with the shaft.

7. The rotor mast of claim 1, wherein a total length of the inner member is greater than a total length of the outer member.

8. The rotor mast of claim 1, wherein the inner member provides a redundant structure capable of reacting axial loads in the event the outer member fails.

9. The rotor mast of claim 1, wherein an external surface of the clamping element is flush with the external surface of the outer member.

10. An aircraft, comprising:
a fuselage;
a powerplant configured to produce rotational energy; and
a rotor assembly, comprising:
a rotor hub;
a plurality of rotor blades extending from the rotor hub; and
a rotor mast coupled to the rotor hub, the rotor mast being configured to receive the rotational energy produced by the powerplant and transmit it to the rotor hub, the rotor mast comprising:
a metallic outer member including an external surface, an internal surface, a first bearing area perpendicular to an axis of the outer member, and a second bearing area perpendicular to the axis of the outer member, wherein the internal surface defines a channel extending between the first bearing area and the second bearing area; and
an inner member including a composite shaft disposed within the channel of the outer member, the inner member including a first bearing surface perpendicular to an axis of the inner member and coupled to a first end of the composite shaft and a second bearing surface perpendicular to the axis of the inner member and coupled to a second end of the shaft;
wherein the inner member and outer member are not bonded to each other;
wherein the first bearing area is in contact with the first bearing surface and the second bearing area is in contact with the second bearing surface for reacting opposing axial forces when the outer member is under compression along a length thereof between the first bearing area and the second bearing area and the inner member is under tension along a length thereof between the first bearing surface and the second bearing surface,
wherein the inner member provides a redundant structure capable of reacting axial loads between the rotor hub and the powerplant in the event the outer member fails.

11. The aircraft of claim 10, wherein the metallic outer member comprises steel and the composite shaft of the inner member comprises a carbon-fiber-reinforced polymer.

12. The aircraft of claim 11, wherein the inner member further comprises a first metallic cuff coupled to the first end of the composite shaft and a metallic clamping element coupled to the first metallic cuff, wherein the first bearing surface is on the metallic clamping element.

13. The aircraft of claim 12, wherein the inner member further comprises a second metallic cuff coupled to the second end of the composite shaft, wherein the second bearing surface is on the second metallic cuff.

14. The rotor mast of claim 10, wherein an external surface of the clamping element is flush with the external surface of the outer member.

15. A rotor mast, comprising:
an outer member including an external surface, an internal surface, a first bearing area perpendicular to an axis of the outer member, and a second bearing area perpendicular to the axis of the outer member, wherein the internal surface defines a channel extending between the first bearing area and the second bearing area; and
an inner member, comprising:
a shaft at least partially disposed within the channel of the outer member;
a first cuff coupled to a first end of the shaft and having external threads;
a clamping element having internal threads and a first bearing surface perpendicular to an axis of the inner member, the internal threads being configured for engaging the external threads of the first cuff; and
a second cuff coupled to a second end of the shaft and having a second bearing surface perpendicular to the axis of the inner member;
wherein each cuff is fastened to the associated end with fasteners extending radially toward the axis of the inner member;
wherein the inner member and outer member are not bonded to each other;
wherein the first bearing area is in contact with the first bearing surface and the second bearing area is in contact with the second bearing surface for reacting opposing axial forces when the outer member is under compression along a length thereof between the first bearing area and the second bearing area and the inner member is under tension along a length thereof between the first bearing surface and the second bearing surface.

16. The rotor mast of claim 15, wherein the outer member is formed from metal.

17. The rotor mast of claim 15, wherein the shaft is formed from a composite material.

18. The rotor mast of claim 15, wherein the shaft is formed from a composite material, and the first cuff and clamping element are formed from a metal.

19. The rotor mast of claim 15, wherein the inner member provides a redundant structure capable of reacting axial loads in the event the outer member fails.

20. The rotor mast of claim 15, wherein an external surface of the clamping element is flush with the external surface of the outer member.

* * * * *